US007738571B2

(12) United States Patent
Costa et al.

(10) Patent No.: US 7,738,571 B2
(45) Date of Patent: Jun. 15, 2010

(54) METHOD AND COMMUNICATION SYSTEM DEVICE FOR THE GENERATION OR PROCESSING OF OFDM SYMBOLS IN A TRANSMISSION SYSTEM WITH SPREAD USER DATA

(75) Inventors: Elena Costa, Garching (DE); Dirk Galda, Hamburg (DE); Harald Haas, Bremen (DE); Hermann Rohling, Hamburg (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 1035 days.

(21) Appl. No.: 10/489,956

(22) PCT Filed: Sep. 16, 2002

(86) PCT No.: PCT/EP02/10382

§ 371 (c)(1),
(2), (4) Date: Sep. 20, 2004

(87) PCT Pub. No.: WO03/026193

PCT Pub. Date: Mar. 27, 2003

(65) Prior Publication Data

US 2005/0018782 A1    Jan. 27, 2005

(30) Foreign Application Priority Data

Sep. 18, 2001    (DE)    ................................ 101 46 002
Sep. 18, 2001    (EP)    ................................... 01122310

(51) Int. Cl.
*H04K 1/10*    (2006.01)

(52) U.S. Cl. ........................................................ 375/260
(58) Field of Classification Search ................. 375/260, 375/299
See application file for complete search history.

(56) References Cited

U.S. PATENT DOCUMENTS

| 5,818,813 | A  |   | 10/1998 | Saito et al. |
| 6,178,158 | B1 |   | 1/2001  | Suzuki et al. |
| 6,188,717 | B1 |   | 2/2001  | Kaiser et al. |
| 6,347,071 | B1 | * | 2/2002  | Cupo et al. ................. 370/203 |
| 2004/0141548 | A1 | * | 7/2004 | Shattil ....................... 375/146 |
| 2006/0093067 | A1 | * | 5/2006 | Jalali et al. ................. 375/299 |

FOREIGN PATENT DOCUMENTS

| DE | 10129802 | 1/2002 |
| EP | 0 966 133 | 12/1992 |

(Continued)

OTHER PUBLICATIONS

Karsten Bruninghaus et al., "Multi-Carrier Spread Spectrum and its Relationship to Single-Carrier Transmission", Proc. IEEE VTC '98, Apr. 1998, pp. 2329-2332.

(Continued)

*Primary Examiner*—Don N Vo
(74) *Attorney, Agent, or Firm*—Staas & Halsey LLP

(57) ABSTRACT

OFDM symbols are generated using data from one or more users or from one or more data sources represented on a number of sub-carriers. To inhibit multiple-access interference on application of the CDMA principle, the data are transformed in a data-source specific manner and only subsequently allocated to the sub-carriers, independently of the transformation.

7 Claims, 4 Drawing Sheets

FOREIGN PATENT DOCUMENTS

WO  99/62207   12/1999
WO  00/79722   12/2000

OTHER PUBLICATIONS

Nathan Yee et al., "Controlled Equalization of Multi-Carrier CDMA in an Indoor Rician Fading Channel", Proc. IEEE VTC '94, Mar. 1994, pp. 1665-1669.

Gary J. Saulnier et al., "OFDM Spread Spectrum Communications Using Lapped Transforms and Interference Excision", IEEE Conference on Communications, Jun. 1997, pp. 944-948.

T.F. Ho et al., "Synthesis of Low-Crest Waveforms for Multicarrier CDMA System", 1995 Global Telecommunications Conference, Nov. 1995, pp. 131-135.

Khaled Fazel et al., "Multi-Carrier Spread-Spectrum Multiple-Access Systems", XP-002193839, pp. xi-xiii, Aug. 1997.

* cited by examiner

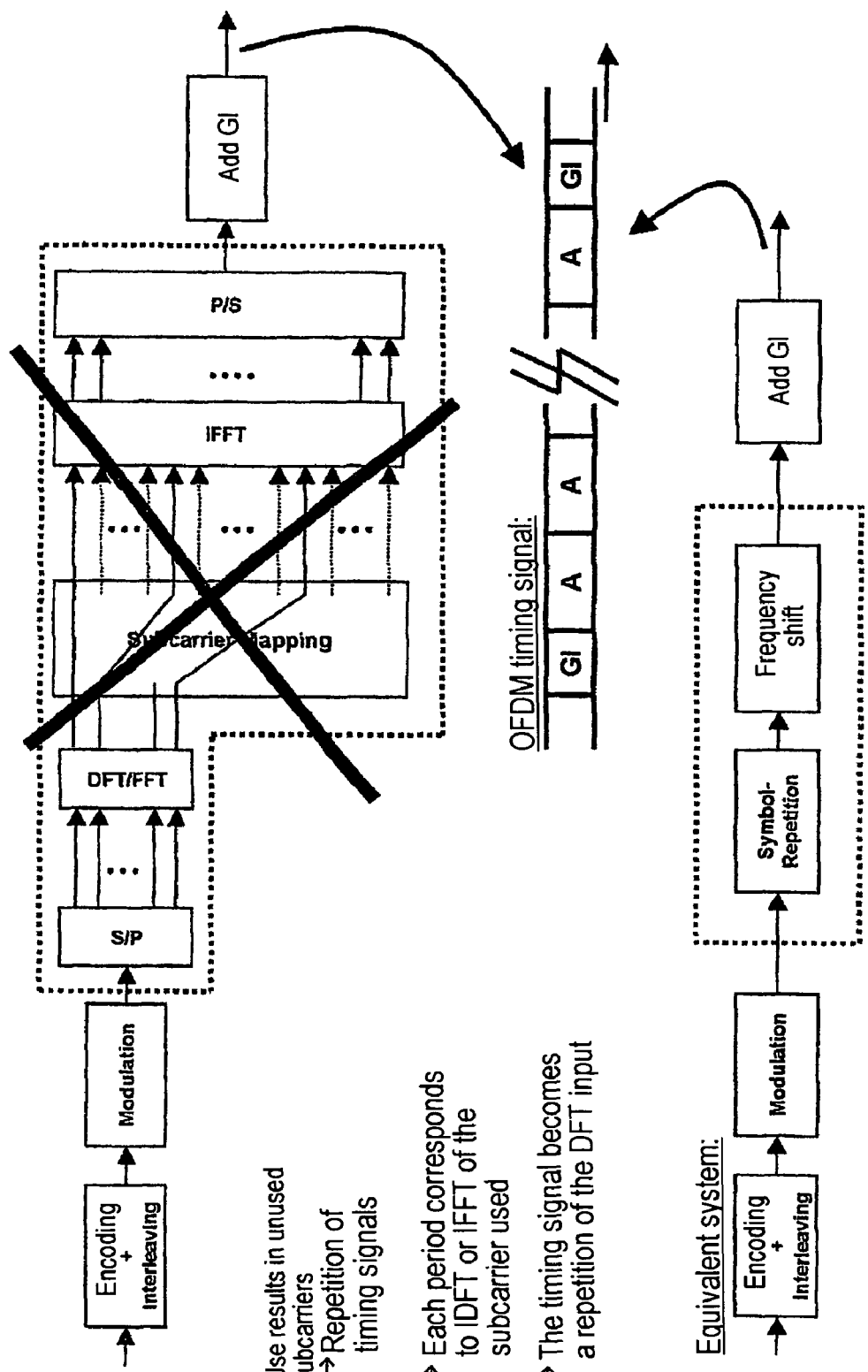
FIG 4: OFDM-FDMA Uplink (only one user sending)

METHOD AND COMMUNICATION SYSTEM DEVICE FOR THE GENERATION OR PROCESSING OF OFDM SYMBOLS IN A TRANSMISSION SYSTEM WITH SPREAD USER DATA

CROSS REFERENCE TO RELATED APPLICATIONS

This application is based on and hereby claims priority to German Application No. 10146002.3 filed on Sep. 18, 2001 and European Application No. 01122310.4 filed Sep. 18, 2001, the contents of both of which are hereby incorporated by reference.

BACKGROUND OF THE INVENTION

1. Field of the Invention

The invention relates to a method for generation or processing of OFDM symbols and a communication system device to execute such a method.

2. Description of the Related Art

With modern communication systems, especially those which comply with the GSM (Global System for Mobile Communications) or UMTS (Universal Mobile Telecommunications System) Standards, the user data is encoded and divided up on a carrier before a send signal is generated.

With fourth-generation communication systems multiple access methods with OFDM transmission systems (OFDM: Orthogonal Frequency Division Multiplex) are planned. These assign the user data or data from specific data sources in each case to a number of subcarriers in OFDM symbols (OFDM-TDMA) or to a number of different subcarriers (OFDM-FDMA). With OFDM-FDMA (FDMA: Frequency Division Multiple Access) for example the subcarriers represent individual adjacent frequency bands of a larger frequency range in each case. Also known for example is the process of exclusively assigning the user data to a number of complete OFDM symbols in each case, as with OFDM-TDMA (TDMA: Time Division Multiple Access), where the user data in the OFDM symbol for transmission over the interface between different communication stations is assigned in a consecutive sequence, especially user data of a station assigned in each case to one or more of the OFDM symbols directly following each other. Such OFDM transmission methods avoid Inter-Symbol Interferences (ISI).

Furthermore, Multiple Access Interferences (MAI) are avoided with both these multiple access methods.

In accordance with an alternate procedure, by using orthogonal codes with the aid of an orthogonal matrix, the user data can be spread over a specified number of subcarriers and/or OFDM symbols, as with the methods known under OFDM-CDMA or MC-CDMA (CDMA: Code Division Multiple Access; MC: Multiple Carrier). With the OFDM-CDMA method the data of all users is assigned to all available frequencies, in which case codes are used for separation. Without further measures, undesired multiple access interferences occur in this case and especially when considering a number of users or data sources for which the data enters in parallel.

To avoid this problem the user data is thus only spread over a number of subcarriers for simultaneous assignment of subcarriers to a number of users, which is referred to as OFDM-FDMA with user-specific spreading of payload data. Spreading and assignment of subcarriers is undertaken here in a common and comprehensive procedure step. What are known as Walsh-Hadamard Matrices of different sizes are predominantly used for spreading, as known for example from M. Yee, J.-P. Linnartz: Controlled Equalization of Multi-Carrier CDMA in an Indoor Rician Fading Channel, Proc. IEEE VTC'94, Stockholm, Sweden, 1994, or T. Müller, K. Bruninghaus, H. Rohling: Performance of Coherent OFDM-CDMA for Broadband Mobile Communications, Wireless Personal Communications, Kluwer Academic Publisher, 1996. In such systems different users, depending on the data rate required, are assigned a number between 1 and N of the orthogonal codes, with N being the number of available subcarriers.

Furthermore, K. Bruninghaus, H. Rohling: Multi Carrier Spread Spectrum and its Relationship to Single-Carrier Transmission, Proc. IEEE VTC '98, Ottawa, channel, 1998, contains a general discussion of spreading using an FFT matrix (FFT: Fast Fourier Transformation) to reduce the ratio of peak values to average values (PAR: Peak-to-Average-Ratios), in which case multiple accesses are not taken into account however.

SUMMARY OF THE INVENTION

An object of the invention is to specify an alternate method for generating OFDM symbols or suitable communication stations to execute such a method. This object is achieved by a method for generating OFDM symbols as well as by a communication system device.

Advantageously, by data source-specific, i.e. exclusive assignment of subcarriers to the relevant users or user data on which the transformation result of an orthogonal transformation matrix or spreading is transmitted, despite the use of the transformation the undesired multiple access interferences can be avoided, completely in the ideal case.

Advantageously any orthogonal matrix can initially be chosen here. Furthermore the assignment of the transformation result to the exclusive subcarriers of a user or a data source can initially be undertaken in any way.

The separation of spreading of user-specific data or data source-specific data and the assignment of the transformed or spread data to the subcarriers of one or more OFDM symbols is especially advantageous if a Discrete Fourier Transformation (DFT) or Fast Fourier Transformation (FFT) is used for the spreading instead of the Walsh-Hadamard Transformation for example.

Especially in combination with an equidistant arrangement of the subcarriers on the carrier, especially on the frequency axis for the different user data or data sources, this then produces an OFDM-FDMA system in which the timing signal or the OFDM symbols feature a constant encapsulator behind the usual Inverse Fast Fourier-Transformation (IFFT). This is a quite significant advantage since the various methods of smoothing which would currently be applied, become unnecessary.

Especially with the combination of a Fourier Transformation and an Inverse Fourier Transformation in an especially preferred embodiment a simplified generation of an OFDM symbol can be undertaken since the corresponding procedural steps can be omitted in its generation. The two successive Fourier Transformations can cancel each other out here in their effect except for especially one frequency shift. Correspondingly in accordance with the invention it is possible in communication between for example a mobile user station and a base station in the uplink direction to distribute or to combine the incoming data of the individual data sources if necessary after normal encoding, interleaving and modulation directly onto the corresponding OFDM symbol positions. This advantageously simplifies the design of the sending communication station. Usefully the base can remain unchanged and continue to possess the structure of an OFDM receiver to enable it to exploit the OFDM-specific advantages such as simple equalization of the receive signal and separation of the user station data or the users.

At first glance timed repetition of the sequence of data in the OFDM symbol produces great redundancy. Since however on sending on the radio interface the correspondingly generated signals overlay a large number of stations this redundancy in the system as a whole under full load is not available for specific data sources. For example with threefold redundancy for a data source, this corresponds to four periods or a seizure of each fourth subcarrier, four data sources can simultaneously access the air interface without interference.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 is a block and timing diagram of an assignment of spread user data to equidistant subcarriers and FIG. 4 is a block diagram of an especially preferred form of realization for executing the method.

DETAILED DESCRIPTION OF THE PREFERRED EMBODIMENT

Figure 1:
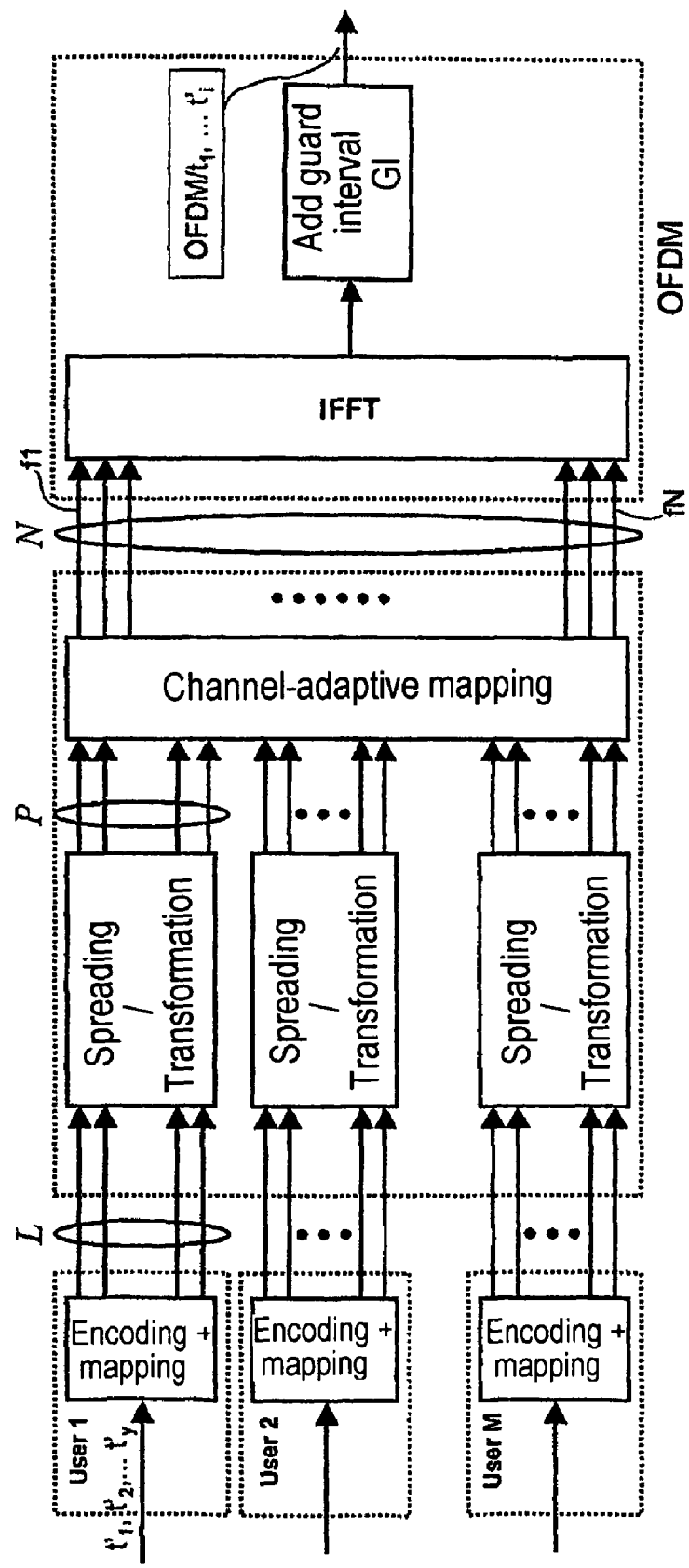
FIG. 1 is a block diagram of a scheme for a general Multiple Access showing the structure of an OFDM-FDMA system with user-specific spreading of the data symbols.

Reference will now be made in detail to the preferred embodiments of the present invention, examples of which are illustrated in the accompanying drawings, wherein like reference numerals refer to like elements throughout.

As can be seen from FIG. 1 a method of generating OFDM symbols includes various individual steps. Incoming user data from individual users or user stations or data sources are individual data t'1, t'2, t'y, which arrive in chronological order. The example shows the arrival of data from M different users or user stations or data sources (User 1-User M). There follows an individual pre-processing for the data of these users in individual blocks with the pre-processing for example normally consisting of an encoding, an interleaving and a modulation. This first encoding involves channel encoding which is undertaken user-specifically.

Furthermore there is conversion of a serial signal into a parallel signal with the consecutive data being distributed or mapped on to L different data paths or lines. The y timing values are mapped encoded for each data input, with data symbols consisting of L complex individual values for each user. These can be elements of any given symbol set, for example PSK or QAM-modulated data (PSK: Phase Shift Keying; QAM: Quadrature Amplitude Modulation).

The subsequent block shows the actual transformation or spreading and the encoding of the data of different users to the individual frequency subcarriers.

The data arriving in each case for a user on L data paths is spread in a first step, i.e. distributed from a total of L data values to P data values. This preferably serves to exploit the statistically independent propagation of the signals on different subcarriers (frequency diversity). In the preferred exemplary embodiment the number of the individual data values or lines is not changed although this is also possible so that before and after the spreading L complex data values per user are available in each case In analogy to the spreading of the data with Walsh-Hadamard Matrices for OFDM-CDMA, L corresponds to the number of codes assigned to the user station and P the number of the available orthogonal code symbols. The spreading in this case corresponds to a full load system.

In the subsequent step mapping to the individual subcarriers takes place, preferably in the form of channel adaptive mapping. Whereas P or L data lines per user lead into the symbol shown. Nc lines or data paths, representing the individual subcarriers lead out of the symbol. In this case the topmost line represents the subcarrier f1 . . . fN with the lowest frequency f1 and the lowest line shown or the lowest data path stands for the subcarriers with the highest available frequency fN in the frequency band.

After the distribution of the data to the various frequency subcarriers an inverse Fourier transformation, for example an inverse Fast Fourier transformation IFFT, is first executed in the third block shown. The parallel data is converted into serial data In accordance with the current normal conventions a chronological sequence of data values t1 . . . ti, ti+1 . . . t2i, . . . is created here for which a guard interval for creating an OFDM symbol is placed in front as a cyclic continuation of the timing signal.

In the description of the structure of the OFDM-FDMA system with the user-specific spreading of the data symbols an intentional distinction is made here between the spreading or transformation on one hand and the mapping onto the subcarriers on the other hand.

This separation is made so that in a first step the data of the individual users can be initially transformed or spread with the aid of an orthogonal matrix. In the next step the transformation result is then transmitted on subcarriers, with each of the individual users being exclusively assigned subcarriers. In this case the subcarriers can in principle be assigned in any way, with systems being preferred in which the first subcarrier is assigned to the first user and the last subcarrier to the last user. This is however not absolutely necessary and is not desirable for a channel-adapted assignment for example Especially preferred however are systems in which the data of a user is mapped or transmitted on subcarriers equidistantly distributed over the frequency band.

This is advantageous to achieve the constant encapsulator in the uplink. Under some circumstances however it can also be advantageous to assign immediately adjacent subcarriers to the same user station.

The advantage of that despite the use of the transformation Multiple Access interferences (MAI) can be completely avoided, is produced by the fact that the Multiple Access interferences are avoided because of the assignment of orthogonal subcarriers to different user stations. The spreading is a user-specific processing with the received data, by contrast with the code symbols for OFDM-CDMA in the uplink being subject to the same channel effect.

In this case basically any orthogonal matrix can be chosen. Preferred is the Walsh-Hadamard Transformation known per se or especially a Fourier Transformation, especially a Discrete or Fast Fourier Transformation.

Figure 2:
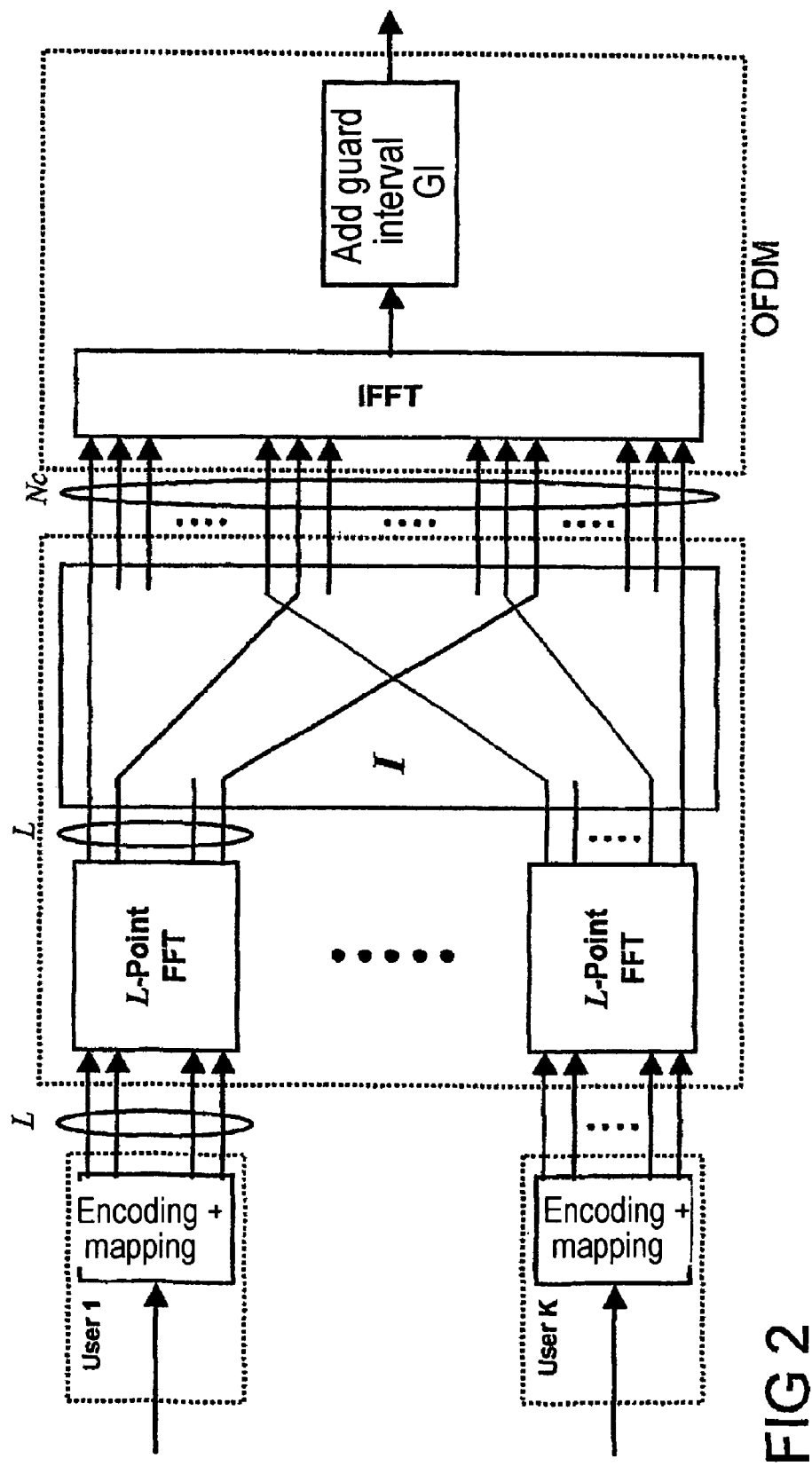
FIG. 2 is a block diagram of a possible realization of an OFDM-FDMA system with an especially preferred FFT spread matrix and assignment of the user data to equidistant subcarriers.

The application of a Fast Fourier Transformation FFT, as preferred form of the transformation or spreading, as well as the subsequent transmission on individual subcarriers can be seen from FIG. 2 in a typical embodiment. The Fourier Transformations FFT are executed user-specifically here, i.e. the data symbols of a user arriving are fed to a separate Fourier Transformation in each case.

The data produced from the individual user-specific Fourier transformations is then distributed to the individual frequency subcarriers f1 ... fN, with the data of a user preferably not being transmitted on directly adjacent subcarriers. Purely in principle however this distribution can be undertaken in any way on the individual subcarriers.

Figure 3:
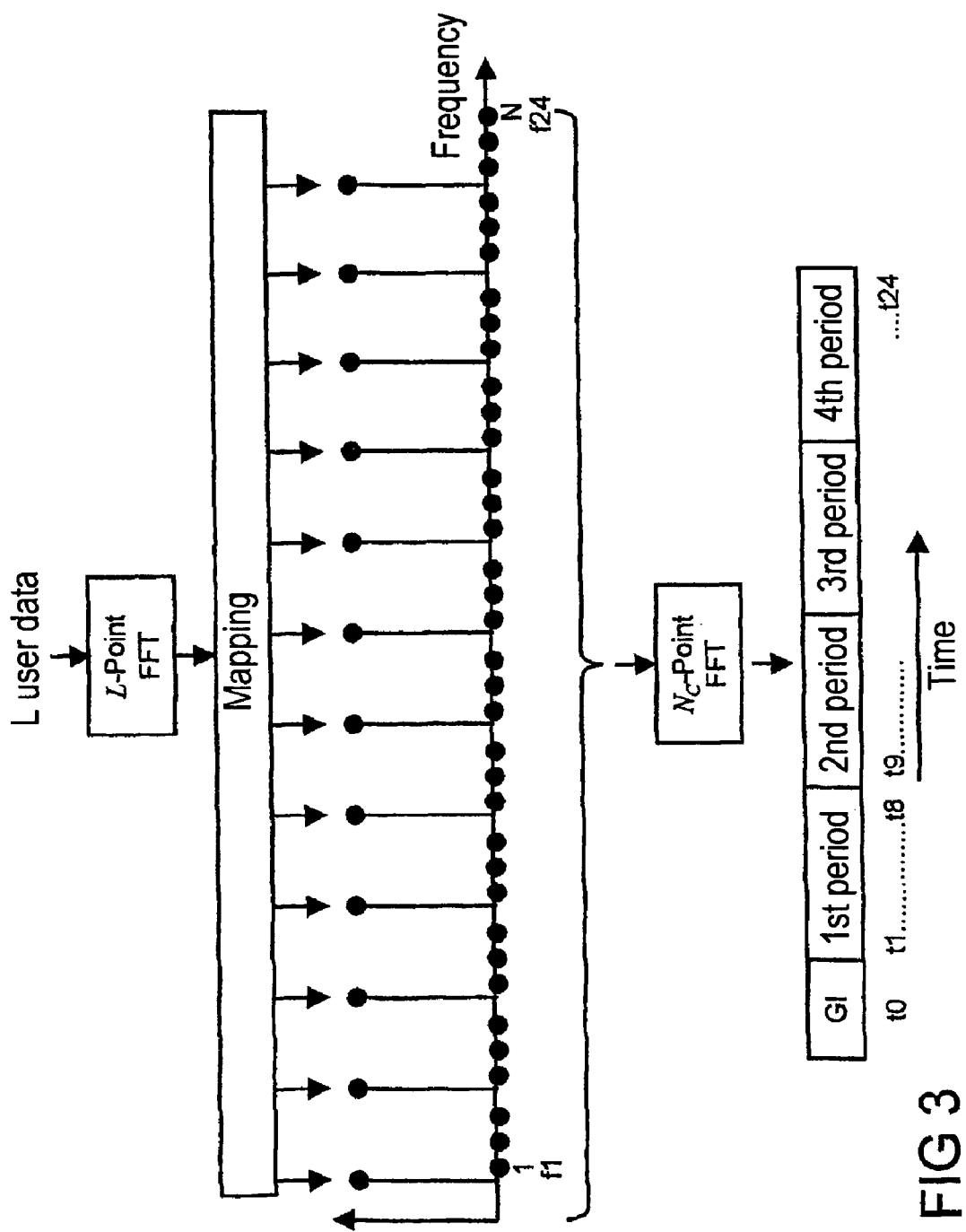

As can be seen from FIG. 3, an especially preferred distribution of the individual data of the user-specific Fourier Transformations to an equidistant sequence of subcarriers is undertaken via the frequency axis. In the exemplary embodiment shown L user data or data symbols with L data values of a user are introduced into the L-Point Fourier Transformation. In accordance with the preferred exemplary embodiment, but not absolutely necessary, L data values are in turn created by the Fourier Transformation which are mapped onto the N subcarriers.

The transformed values are mapped in this example to N=24 frequency channels as subcarriers f1 ... f24, in which case the number of the L data values should correspond to L=8. As shown, with an a equidistant distribution to the subcarrier f1, the first data value can be distributed to or transmitted on the subcarrier f1, of the second data value to the 5th subcarrier f5.

An Nc-point Inverse Fourier-Transformation (NcPoint FFT) follows, which is it shown in this drawing as IFFT. After conversion into a serial data sequence a chronological sequence of individual data values to be transmitted over an interface is produced. After prefixing the series with a guard interval GI an OFDM symbol is produced here from a guard interval GI and 24 chronologically-consecutive data values t1 ... t24. As shown, in this a equidistant distribution the individual data values are distributed to four sections or periods with all periods of the timing signal of each user being identical. A periodical repetition of the data sequence is produced.

If the sender involved is a mobile station, as is shown in FIG. 4, further subcarriers also remain unoccupied since these are used in the uplink by other mobile users in other mobile stations. In the downlink the send signal consists of the overlaying of the periodic send signals of all subscribers. If the same number L of subcarriers is assigned to all users the sum signal possesses the same periodicity as the signal of each individual user. If different numbers of subcarriers are assigned to different users, the sum signal does not absolutely have to possess a periodic signal curve In the uplink the send signal possesses a constant encapsulator whereas in the downlink, because of the overlaying of the signals of different users or user stations the encapsulator is as a rule no longer constant, but features a far lower peak value than a conventional OFDM signal. Correspondingly FIG. 2 shows the uplink connection/downlink case with a number of users per sender and FIG. 3 the uplink case.

Put into simple generalized terms, with a data symbol length L of the user the data and a mapping to likewise L-point transformation results, this causes a mapping to subcarriers f1 ... fN, with N subcarriers being available. After the inverse Fourier Transformation the OFDM symbol then has the length N plus the length of the guard interval GI. The individual data values here, with equidistantly distribution are distributed over N/L data periods, with the data periods also able to be referred to as data blocks or data sections.

The particular advantage of the combination of a spread matrix formed by a Fourier Transformation FFT in combination with the equidistant distribution on the frequency axis lies in the fact that, after the inverse Fourier Transformation in the uplink a timing signal with a constant encapsulator and in the downlink a timing signal with a peak value which is much-reduced by contrast with a conventional OFDM system is produced. This constant encapsulator is produced since the peak to average value ratio (PAR) is far lower than with other generation methods for OFDM symbols. If a PSK modulation were to be used here, the PAR=1.

To assist understanding it is formally pointed out that a general linear transformation is involved here, that is even with the use of a Fourier Transformation to transform or spread the user-specific data no direct relationship of a frequency area to a period exists, as would be the case for normal considerations of Fourier Transformations.

In accordance with a further developed embodiment, for the case of the consideration of a Fourier Transformation as spreading matrix and a subsequent Inverse Fourier Transformation to transmit the individual frequency subcarriers on a timing data sequence it can be established that purely theoretically the two Fourier Transformations cancel each other out. As a consequence a particularly preferred embodiment for generating OFDM symbols can be used, as is shown for example in FIG. 4 for example for a transmission in the uplink direction from a user station to a network-side station if only one single user is sending, in which case the transformations cancel each other out.

Through the canceling-out effect of the series of transformations of a Fourier Transformation FFT and after the distribution to the individual subcarriers f1 ... fN of an Inverse Fourier Transformation IFFT this block can be omitted in the conversion or replaced by a repetition of the symbol sequence in accordance with the number of the assigned, now fictitious, subcarriers and subsequent frequency shifting for a distribution of the input data to the output data.

A repeat of the timing signals is produced by the subcarriers which are not assigned to the user remaining unmodulated. Each individual period of the OFDM signal then corresponds in the final analysis to the inverse discrete Fourier Transformation of the subcarriers used. Thus, with ideal conversion and later error-free transmission over the interface the received OFDM then theoretically contains on the receiver side, behind the guard interval GI, a number of periods with the same data sequence in each case. The timing signals would thus correspond to a repeating sequence of the original inputs in the discrete Fourier Transformation which would be undertaken initially in accordance with the exemplary embodiment of FIG. 2.

As can be seen from the bottom area of FIG. 4, this produces an equivalent system in which the blocks with the conversions of serial into parallel data, the subscriber-specific Fourier Transformations, the mapping or transmission on the subcarriers, the inverse Fourier Transformation and the conversion of parallel into serial data can be replaced by a series of repeating symbols and a corresponding frequency shift to be performed.

The invention has been described in detail with particular reference to preferred embodiments thereof and examples, but it will be understood that variations and modifications can be effected within the spirit and scope of the invention.

The invention claimed is:

1. A method for creating orthogonal frequency division multiplex symbols in a signal broadcast by a communication system, comprising:

in a first operation of the communication system, obtaining data values by applying a Fourier transform to data from a data source, and mapping the data values obtained to orthogonal subcarriers of a carrier;

in a second operation of the communication system, mapping the data values to a group of blocks, each of the blocks including all of the data values, where the number of blocks depends on the number of orthogonal subcarriers used; and in a third operation of the communication system, producing one of the orthogonal frequency division multiplex symbols by adding a guard interval to the group of blocks to produce an output signal that is physically different from the data from the data source.

2. A method in accordance with claim 1, wherein data extracted from the one of the orthogonal frequency division multiplex symbols is used upon receipt by repetition of a complete data sequence corresponding to a number of assigned subcarriers and a subsequent frequency shift.

3. A method in accordance with claim 1, wherein said obtaining of the data values maps transformed data from one of the data sources to a number of the orthogonal subcarriers and only the transformed data of one data source is assigned to each orthogonal subcarrier.

4. A method in accordance with claim 3, wherein the transformed data of each of the data sources is distributed evenly over the carrier.

5. The method of claim 1, further comprising processing the data from the data source by applying channel coding and modulation prior to the first operation.

6. A device in a communication system, comprising:

a data input unit receiving data from at least one data source;

at least one storage unit, coupled to said data input unit, temporarily storing the data from the at least one data source; and a control device, coupled to said at least one storage unit, obtaining data values by applying a Fourier transform to the data received by said data input unit, mapping the data values obtained to orthogonal subcarriers of a carrier, then mapping the data values to a group of blocks, each of the blocks including all of the data values, where the number of blocks depends on the number of orthogonal subcarriers used, and producing one of the orthogonal frequency division multiplex symbols by adding a guard interval to the group of blocks.

7. A mobile station in a communication system, generating orthogonal frequency division multiplex symbols, comprising:

a data input unit receiving data from at least one data source;

at least one storage unit, coupled to said data input unit, temporarily storing the data from the at least one data source; and a control device, coupled to said at least one storage unit, generating the orthogonal frequency division multiplex symbols by repeating symbols and producing a frequency shift of the orthogonal frequency division multiplex symbols, corresponding to conversion of serial into parallel data, subscriber-specific Fourier Transformation, mapping onto subcarriers, inverse Fourier Transformation and conversion of parallel into serial data.

* * * * *